(12) United States Patent
Veldkamp et al.

(10) Patent No.: US 11,946,448 B2
(45) Date of Patent: Apr. 2, 2024

(54) SYSTEM FOR CONTACTLESS DISPLACEMENT MEASUREMENT OF A BLADE ROOT OF A WIND TURBINE

(71) Applicant: General Electric Company, Schenectady, NY (US)

(72) Inventors: Bart Jan Veldkamp, Salzbergen (DE); Till Hoffmann, Salzbergen (DE)

(73) Assignee: General Electric Company, Schenectady, NY (US)

( * ) Notice: Subject to any disclaimer, the term of this patent is extended or adjusted under 35 U.S.C. 154(b) by 28 days.

(21) Appl. No.: 17/071,090

(22) Filed: Oct. 15, 2020

(65) Prior Publication Data
US 2021/0115904 A1    Apr. 22, 2021

(30) Foreign Application Priority Data
Oct. 18, 2019   (EP) .................................... 19204128

(51) Int. Cl.
*F03D 17/00*    (2016.01)
*F03D 7/02*    (2006.01)
(Continued)

(52) U.S. Cl.
CPC .......... *F03D 17/00* (2016.05); *F03D 7/0224* (2013.01); *F03D 7/024* (2013.01); *F03D 7/042* (2013.01);
(Continued)

(58) Field of Classification Search
CPC ........ F03D 7/0224; F03D 7/024; F03D 7/042; F03D 17/00; F05B 2260/70; F05B 2270/328; F05B 2270/80
See application file for complete search history.

(56) References Cited

U.S. PATENT DOCUMENTS 7,059,822 B2 * 6/2006 LeMieux ................ F03D 17/00
416/61
8,075,267 B2 * 12/2011 Enevoldsen ........... G01B 11/16
416/61
(Continued)

FOREIGN PATENT DOCUMENTS

GB         2 448 940 A      11/2008
WO    WO-03064854 A1 *  8/2003   ........... F03D 1/0658
(Continued)

OTHER PUBLICATIONS

EPO Search Report, dated Apr. 24, 2020.

*Primary Examiner* — Christopher R Legendre
(74) *Attorney, Agent, or Firm* — Dority & Manning, P.A.

(57) ABSTRACT

A system for measuring displacements of a blade root of a rotor blade of a wind turbine includes a hub, and a rotor blade coupled to the hub by a pitch bearing. The system further comprises a reference plane and at least one displacement sensor. The reference plane is configured to move with the rotor blade as the rotor blade moves relative to the hub while the displacement sensor is fixed to the hub and the displacement sensor is configured to detect a displacement of the reference plane relative to the hub without physical contact. Alternatively, the reference plane has a fixed position with respect to the hub while the displacement sensor is fixed to the rotor blade and the displacement sensor is configured to detect a displacement of the reference plane relative to the rotor blade without physical contact.

9 Claims, 12 Drawing Sheets

(51) Int. Cl.
  *F03D 7/04* (2006.01)
  *F03D 80/70* (2016.01)
  *G01B 11/24* (2006.01)
  *G01B 21/00* (2006.01)
  *G01M 5/00* (2006.01)
  *G01M 11/08* (2006.01)

(52) U.S. Cl.
  CPC .............. *F03D 80/70* (2016.05); *G01B 11/24* (2013.01); *G01B 21/00* (2013.01); *G01M 5/0041* (2013.01); *G01M 11/081* (2013.01); *F05B 2240/50* (2013.01); *F05B 2260/70* (2013.01); *F05B 2270/328* (2013.01); *F05B 2270/80* (2013.01)

(56) References Cited

U.S. PATENT DOCUMENTS

| | | | |
|---|---|---|---|
| 8,547,558 B2 * | 10/2013 | Weigel | F03D 17/00 416/61 |
| 8,591,187 B2 | 11/2013 | Bagepalli et al. | |
| 9,261,355 B2 * | 2/2016 | Bertolotti | G01B 11/24 |
| 9,670,902 B2 * | 6/2017 | Philipsen | F03D 1/0675 |
| 9,938,964 B2 * | 4/2018 | Kötting | F03D 1/0675 |
| 2011/0049886 A1 | 3/2011 | Becker et al. | |
| 2011/0103933 A1 * | 5/2011 | Olesen | F03D 17/00 415/118 |
| 2012/0192391 A1 * | 8/2012 | Tobinaga | F03D 80/70 29/889 |
| 2013/0093879 A1 | 4/2013 | Bertolotti | |
| 2014/0271181 A1 | 9/2014 | Perley et al. | |
| 2021/0115904 A1 * | 4/2021 | Veldkamp | G01M 5/0041 |

FOREIGN PATENT DOCUMENTS

| | | |
|---|---|---|
| WO | WO 2013/110215 A1 | 8/2013 |
| WO | WO 2018/206065 A1 | 11/2018 |

* cited by examiner

SYSTEM FOR CONTACTLESS DISPLACEMENT MEASUREMENT OF A BLADE ROOT OF A WIND TURBINE

FIELD

The present subject matter relates generally to wind turbines, and more particularly to a system and a method for measuring displacements of a blade root of a rotor blade of a wind turbine.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbines are exposed to various fluctuating wind loads acting on the different components of the wind turbines. In order to control or limit the energy generated by the wind, modern wind turbines often comprise rotor blades that are rotatable about its longitudinal axis (pitch axis). By adjusting the pitch angle of a rotor blade the inflow conditions and, thus, the wind loads acting on the rotor blade can be influenced in order to increase efficiency of the wind turbine or to slow down the wind turbine in strong gusts.

Such pitch adjustment requires information about the wind loads acting on the rotor blades. This information is difficult to obtain, e.g. due to the stochastic distribution of the wind, the dynamic nature of the system itself and the transfer of loads between different components of the system. Dynamic simulations can provide estimated values but it would be advantageous to monitor actual parameters that allow a reliable estimation of wind loads.

Accordingly, the present disclosure is directed to systems and methods that allow monitoring of wind loads acting on rotor blades.

BRIEF DESCRIPTION

Aspects and advantages of the invention will be set forth in part in the following description, or may be obvious from the description, or may be learned through practice of the invention.

In one aspect, the present disclosure is directed to a system for measuring displacements of a blade root of a rotor blade of a wind turbine. The system comprises a hub, a rotor blade coupled to the hub by a pitch bearing, a reference plane and at least one displacement sensor configured to detect a displacement of the reference plane without physical contact.

In one embodiment, the reference plane is configured to move with the rotor blade as the rotor blade moves relative to the hub while the displacement sensor is fixed to the hub. According to one aspect, the displacement sensor is configured to detect a displacement of the reference plane relative to the hub without physical contact. In particular, the displacement sensor may be configured to detect a radial, axial and/or tilting displacement of the reference plane relative to the hub.

In another embodiment, the reference plane has a fixed position with respect to the hub while the displacement sensor is fixed to the rotor blade. According to one aspect, the displacement sensor is configured to move with the rotor blade as the rotor blade moves relative to the hub while the hub comprises the reference plane. According to one aspect, the displacement sensor is configured to detect a displacement of the reference plane relative to the rotor blade, in particular, to the blade root of the rotor blade. Especially, the displacement sensor may be configured to detect a radial, axial and/or tilting displacement of the reference plane relative to the blade root.

In one embodiment, the system may further include a controller that is communicatively coupled to the displacement sensor. The controller may be configured to determine a bending moment exerted on a part of the rotor blade, e.g. the blade root of the rotor blade, based on signals received from the displacement sensor.

In further embodiments, the system may comprise a pitch adjustment mechanism which is communicatively coupled with the controller. The pitch adjustment mechanism may be configured to adjust a pitch angle of the rotor blade by rotating the rotor blade around a longitudinal axis (pitch axis) of the rotor blade. The pitch adjustment mechanism may allow the controller to adjust the pitch angle of the rotor blade in dependence of the (processed) data received from the displacement sensor, for example the determined bending moments exerted on a the blade root of the rotor blade. This allows the controller to control loads and/or forces from wind acting on the rotor blade.

In additional embodiments, the system may further comprise a communication path which is configured to transfer the signals received from the displacement sensor to the controller. Specifically for embodiments where the displacement sensor is fixed to the hub, the communication path may be configured to transfer the signals from the displacement sensor to the controller without transferring the signals from the rotor blade to the hub or the other way around. According to one aspect, the rotor blade includes the reference plane.

According to one aspect, the displacement sensor is mounted in the interior of the hub. For example, the reference plane may be a surface facing the center of the hub.

According to another aspect, the displacement sensor is mounted on the exterior of the hub. Then, the reference plane may be on the exterior of the hub as well. For example, the reference plane may be a surface facing the center of the hub.

In some embodiments, the system comprises a plurality of displacement sensors. In particular, the system may comprise at least two displacement sensors. In some embodiments, the system comprises at least three displacement sensors. In further embodiments, the system comprises at least four displacement sensors. For example, the system may comprise exactly four displacement sensors.

According to one aspect, the system comprises a plurality of displacement sensors which are mounted around a longitudinal axis (pitch axis) of the rotor blade. For example, the displacement sensors may be mounted around the longitudinal axis of the rotor blade at a uniform distance from each other, e.g. two sensors at 6 and 12 o'clock; three sensors at 2, 6 and 10 o'clock; four sensors at 3, 6, 9 and 12 o'clock. Alternatively, the displacement sensors may be mounted around the longitudinal axis of the rotor blade at a 90 degree angle to each other.

In another aspect, the present disclosure is directed to a method for measuring displacements of a blade root of a rotor blade of a wind turbine. The method comprises contactless measuring of a displacement of a reference plane relative to a displacement sensor. The contactless measuring of the displacement of the reference plane may be relative to the hub. Such contactless measuring may be performed with at least one displacement sensor fixed to a hub. In this case, the reference plane may be configured to move with a rotor blade which is coupled to the hub as the rotor blade moves relative to the hub. Alternatively, the contactless measuring of the displacement of the reference plane may be relative to the rotor blade. Then, the contactless measuring may be performed with the reverse arrangement, i.e. with at least one displacement sensor fixed to a rotor blade while the reference plane has a fixed position with respect to the hub.

In some embodiments, the method may further comprise transferring a signal from the displacement sensor to a controller. Such transfer may be realized with a communication path.

In some embodiments, the method may further comprise receiving the signal from the displacement sensor with the controller.

In some embodiments, the method may further comprise determining, with the controller, a bending moment exerted on a blade root of the rotor blade based on signals received from the displacement sensor.

In some embodiments, the method may further comprise adjusting a pitch angle of the rotor blade by rotating the rotor blade around a longitudinal axis of the rotor blade. Such adjustment may be realized with a pitch adjustment mechanism. The pitch adjustment mechanism may be controlled by the controller.

It should be understood that the method may further include any of the additional steps and/or features as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
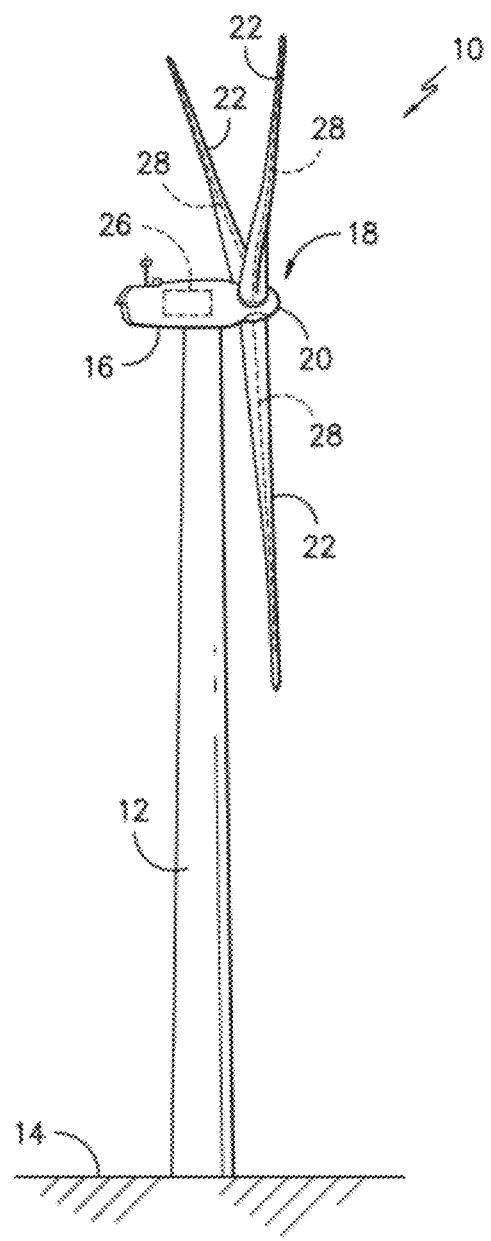
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
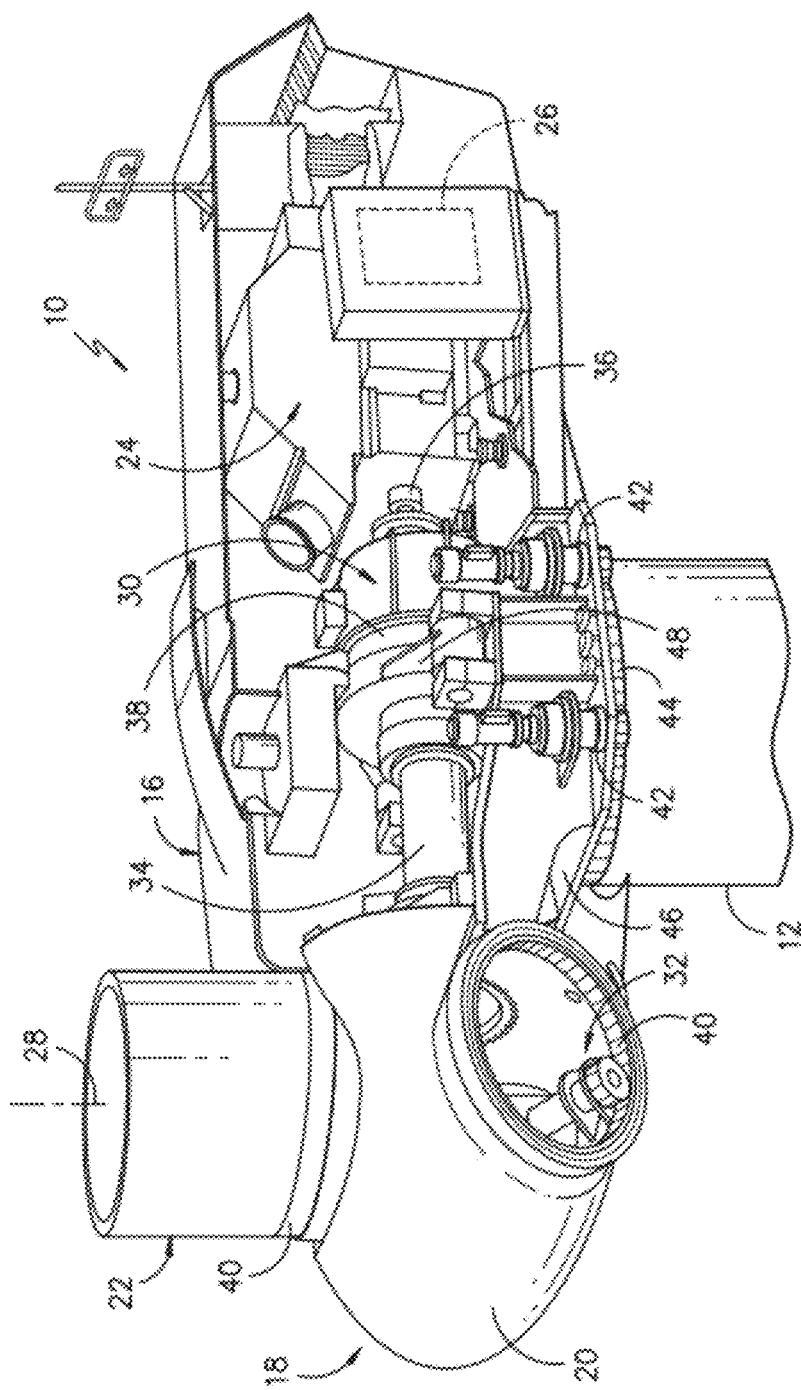
FIG. 2 illustrates a simplified, internal view of one embodiment of a nacelle of a wind turbine according to the present disclosure, particularly illustrating the nacelle during normal operation.

Referring now to the drawings, FIG. 1 illustrates a perspective view of one embodiment of an exemplary wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. The rotor blades 22 may be mated to hub 20 by coupling a blade root 24 (cf FIG. 4) of the respective rotor blade to hub 20. Each rotor blade 22 may be spaced about the hub 20 to facilitate rotating the rotor 18 to enable kinetic energy to be transferred from the wind into usable mechanical energy, and subsequently, electrical energy. As illustrated in FIG. 2, an electric generator 24 positioned within the nacelle 16 and rotatably coupled to the hub 20 may generate electrical energy from the rotational energy of the rotor 18.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Referring now to FIG. 2, a simplified, internal view of one embodiment of the nacelle 16 of the wind turbine 10 shown in FIG. 1 is illustrated, particularly illustrating the drivetrain components thereof. The generator 24 may be coupled to the rotor 18 for producing electrical power from the rotational energy generated by the rotor 18. The rotor 18 may be coupled to the main shaft 34, which is rotatable via a main bearing (not shown). The main shaft 34 may, in turn, be rotatably coupled to a gearbox output shaft 36 of the generator 24 through a gearbox 30. The gearbox 30 may include a gearbox housing 38 that is connected to a bedplate 46 by one or more torque arms 48. More specifically, in certain embodiments, the bedplate 46 may be a forged component in which the main bearing (not shown) is seated and through which the main shaft 34 extends. As is generally understood, the main shaft 34 provides a low speed, high torque input to the gearbox 30 in response to rotation of the rotor blades 22 and the hub 20. Thus, the gearbox 30 thus converts the low speed, high torque input to a high speed, low torque output to drive the gearbox output shaft 36 and, thus, the generator 24.

The wind turbine 10 may include one or more yaw drive mechanisms 42 communicatively coupled to the controller 26. The yaw drive mechanism(s) 42 may be configured to change the angle of the nacelle 16 relative to the wind direction, e.g. by engaging a yaw bearing 44 of the wind turbine 10.

Furthermore, controller 26 may be communicatively coupled to one or more pitch adjustment mechanisms 32. Specifically, each rotor blade 22 may include a pitch adjustment mechanism 32 configured to rotate each rotor blade 22 about its longitudinal axis (pitch axis) 28 via a pitch bearing 40. The longitudinal axis passes through the rotor blade from the tip of the rotor blade to the blade root 24. In particular, the longitudinal axis may be a straight line, infinitely long, infinitely thin and unlimited in both directions. The pitch angle of rotor blades 22 describes an angle that determines a perspective of rotor blades 22 with respect to the direction of the wind. The pitch angle may be changed by pitch adjustment system 32 to control the load and power generated by wind turbine 10 by adjusting an angular position of at least one rotor blade 22 relative to wind vectors. During operation of wind turbine 10, pitch system 32 may change a pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18. In one exemplary embodiment, a pitch angle of each rotor blade 22 is controlled individually by a controller 26. Alternatively, the pitch angle for all rotor blades 22 may be controlled simultaneously by controller 26.

Wind turbines may be exposed to stochastic wind loads acting especially on the rotor blades of the wind turbines. The alternating wind loads acting on the rotor blades 22 are transferred also to other components of the wind turbine. Particularly, the loads may be transferred from the blade root 24 of rotor blade 22 to the pitch bearing 40 causing for example axial and radial forces and tilting moments acting on the pitch bearing 40.

Rotor blade 22 may comprise a rotating component 40*a* of the pitch bearing 40 or more specifically, the blade root 24 may comprise the rotating component 40*a* of the pitch bearing 40. The hub may comprise a corresponding non-rotating component 40*b* of the pitch bearing 40. The rotating component 40*a* as well as the non-rotating component 40*b* may be a ring, respectively. For example, the rotating component 40*a* may be an inner ring which is surrounded by an outer ring being part of the non-rotating component 40*b*. The rotating component 40*a* may also be an outer ring surrounding an inner ring being part of the non-rotating component 40*b*.

Figure 3:
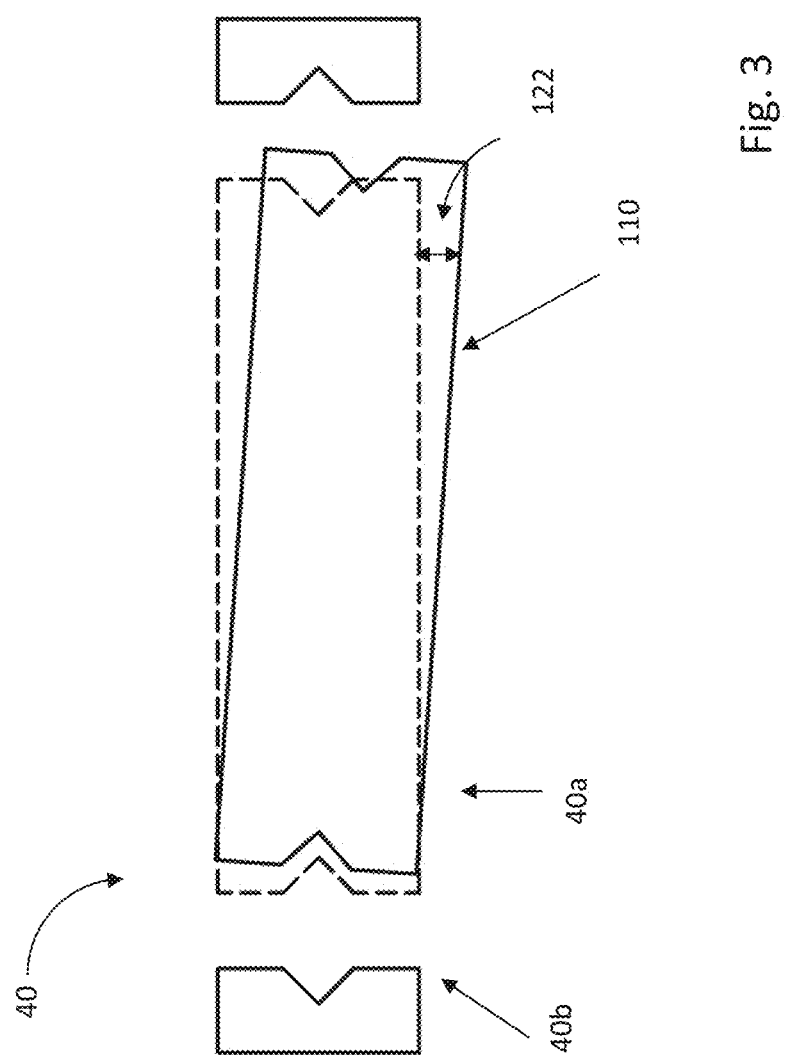
FIG. 3 illustrates a displacement of a bearing component due to forces and moments acting on a rotor blade attached to the bearing component.

FIG. 3 illustrates a displacement of the rotating component 40*a* due to forces and moments acting on the blade root 24 of a rotor blade 22 attached to the rotating component 40*a*. In FIG. 3 the rotating component 40*a* is provided as an inner ring whereas the non-rotating component 40*b* is provided as an outer ring. The non-rotating component 40*b* is assumed to be fixed while the rotating component 40*a* gets displaced due to external loads. Such displacement may be accompanied with the deformation of rolling elements (e.g. balls, rollers) of the pitch bearing 40. The displacements of a blade root 24 may be reflected by a displacement 122 of a reference plane 110. In FIG. 3, the reference plane 110 is configured to move with the blade root 24 of a rotor blade 22 as the blade root 24 of a rotor blade 22 moves relative to the hub.

FIGS. 4 to 9 illustrate a system 100 for measuring displacements of a blade root 24 of a rotor blade 22 of a wind turbine according to the present disclosure. The displacements of the blade root 24 (including the rotating component 40*a*) may reflect moments acting on the blade root 24 and, thus, loads acting on the rotor blade 22. Hence, measurement of displacements of the blade root 24 of rotor blade 22 may be used to determine or at least estimate wind loads acting on the rotor blade 22. As shown, the system 100 comprises a hub 20 and a rotor blade 22, wherein the rotor blade 22 is coupled to the hub 20 by a pitch bearing 40 as described above. In the following, it is understood that the rotor blade 22 includes the blade root 24, the rotating component 40*a* and any other component attached to the rotor blade 22 in such a way that the component rotates with the rotor blade 22 as the rotor blade 22 rotates relative to the hub 20.

The system 100 further comprises a reference plane 110. In FIGS. 4 to 8 the reference plane 110 is configured to move with the rotor blade 22 as the rotor blade moves relative to the hub 20. According to one aspect, the rotor blade comprises the reference plane 110. For example, the reference plane 110 may be a surface of blade root 24, as for instance illustrated in FIG. 4. In another embodiment, the reference plane 110 may be a surface of a flange or bracket attached to the rotor blade 22, as for instance illustrated in FIG. 7.

In several embodiments, the pitch bearing 40 comprises a rotating component 40*a* and a non-rotating component 40*b* as for example described with reference to FIG. 3. The non-rotating component 40*b* may be attached to the hub 20 whereas the rotating component 40*a* may be attached to the rotor blade 22. The non-rotating component 40*b* as well as the rotating component 40*a* may comprise bolts 170*a* providing, for instance, the attachment to the hub 20 and the rotor blade 22, respectively. According to one aspect, the reference plane 110 may be attached to the rotating component 40*a* of the pitch bearing or may be a part of the rotating component 40*a* of the pitch bearing. In one embodiment, the reference plane 110 may be a surface of the pitch bearing 40, in particular, of the rotating component 40*a* of the pitch bearing 40, as for instance illustrated in FIG. 5. For example, the reference plane 110 may be a part of a bottom surface of the rotating component 40*a*, wherein the bottom surface may be a surface pointing to the interior or the center of the hub. Also the bolts 170*a* may provide the reference plane 110, as for instance illustrated in FIG. 6.

Figure 4:
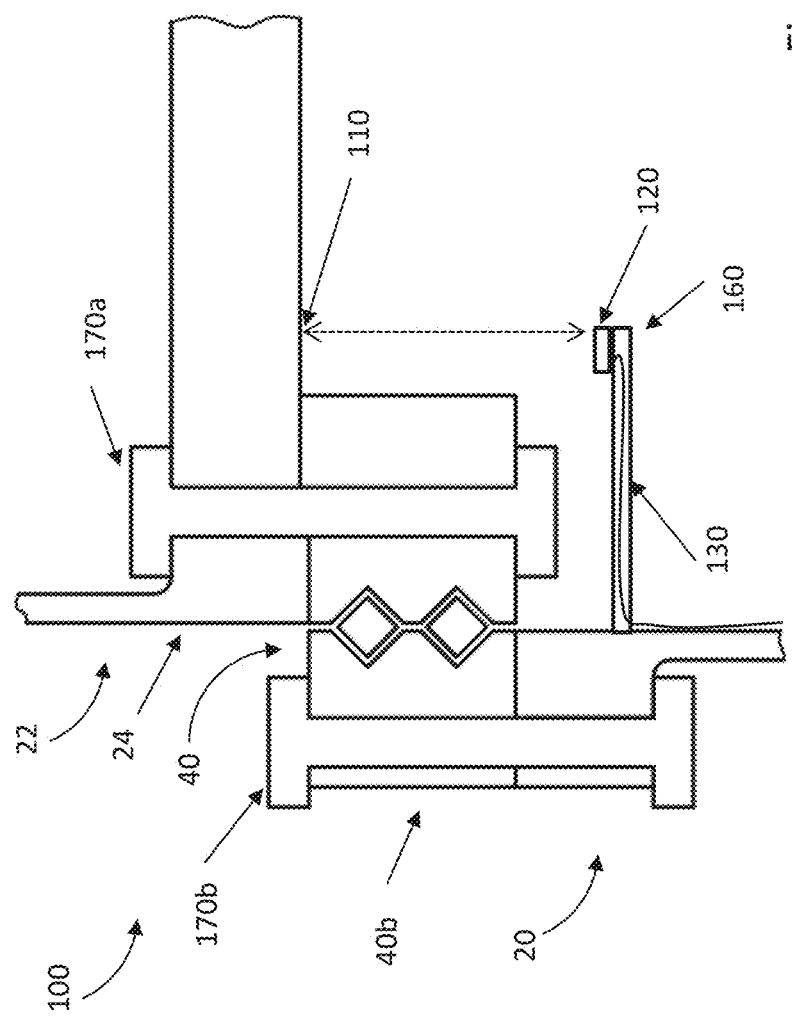
FIGS. 4 to 9 illustrate exemplary embodiments of systems for measuring displacements of a blade root according to the present disclosure.
Figure 5:
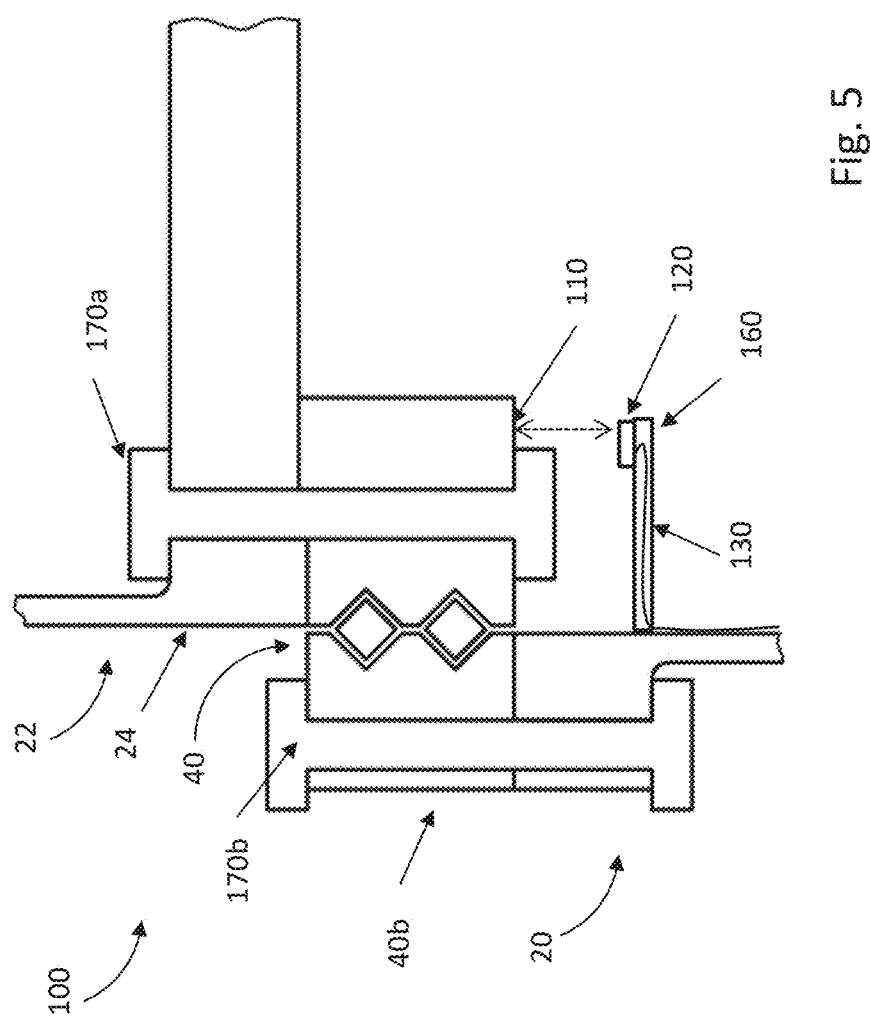
Figure 6:
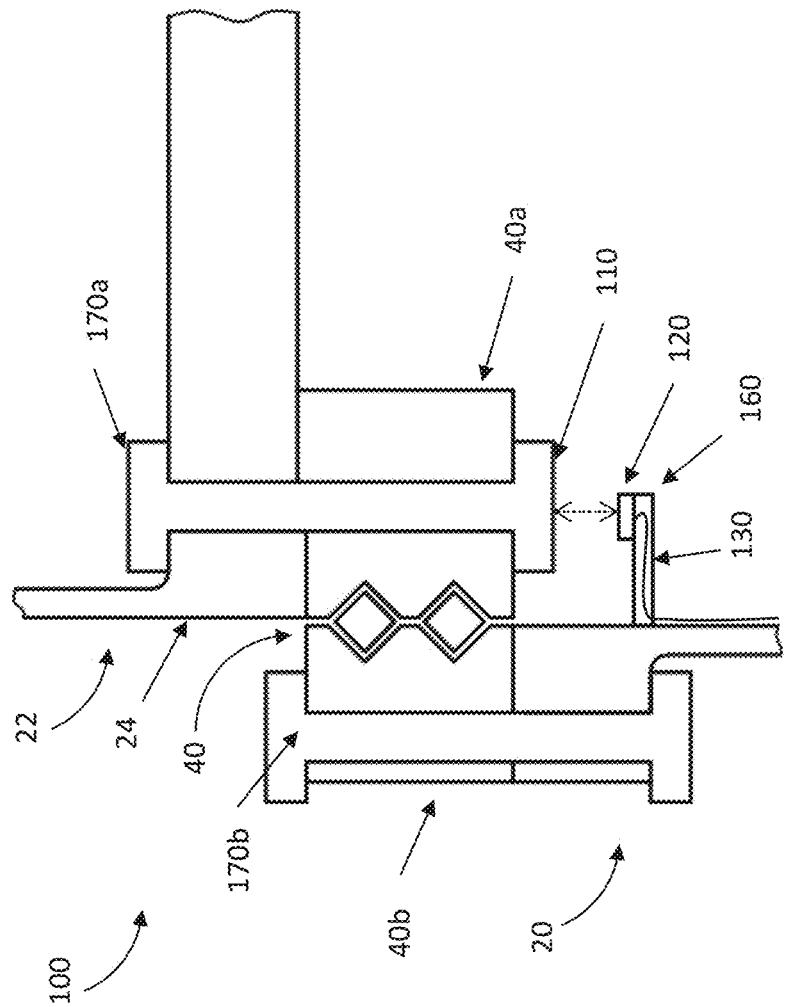

FIGS. 4 to 6 illustrate the reference plane 110 as a bottom surface. A bottom surface essentially faces the center of the hub. A bottom surface may be essentially perpendicular to the pitch axis 28. However, the reference plane 110 may also be a surface that does not face the center of the hub. For example, the reference plane 110 may face a side wall of the hub as for instance illustrated in FIG. 7.

In FIGS. 4 to 7 the reference plane 110 is located in the interior of the hub 20. However, the reference plane 110 may also be located at the exterior of the hub. The latter, for instance, may be advantageous for an arrangement where the rotor blade 22 is attached to the outer component of the pitch bearing 40, for example, where the rotating component 40*a* of the pitch bearing 40 is an outer ring as illustrated in FIG. 8. In analogy to FIGS. 4 to 7 and the description above, the reference plane 110 may be a surface of any component of the rotor blade 22, e.g. blade root 24, rotating component 40*a* or any other component rotating as the rotor blade 22 rotates relative to the hub 20. The reference plane 110 may be a bottom surface, as illustrated in FIG. 8, or may be another surface, e.g. a surface facing the hub.

The material of the reference plane 110 may be chosen such that a displacement sensor, as discussed below, can detect a displacement of the reference surface relative to the hub. Suitable materials of the reference plane 110 may be metals such as steel, copper, aluminum.

Further, the system 100 includes at least one displacement sensor 120. In FIGS. 4 to 8, the displacement sensor 120 is fixed to the hub 20. The displacement sensor 120 in those embodiments is configured to detect a displacement 122 of the reference plane 110 relative to the hub 20 without physical contact. For example, the displacement sensor 120 may be mounted such that the displacement sensor 120 faces the rotor blade 22. For example, the displacement sensor 120 may be mounted opposite the reference plane 110 such that the displacement sensor 120 faces the reference plane 110. According to one aspect, the displacement sensor 120 is configured to detect a radial, axial and/or tilting displacement of the reference plane 110 relative to the hub.

Figure 7:
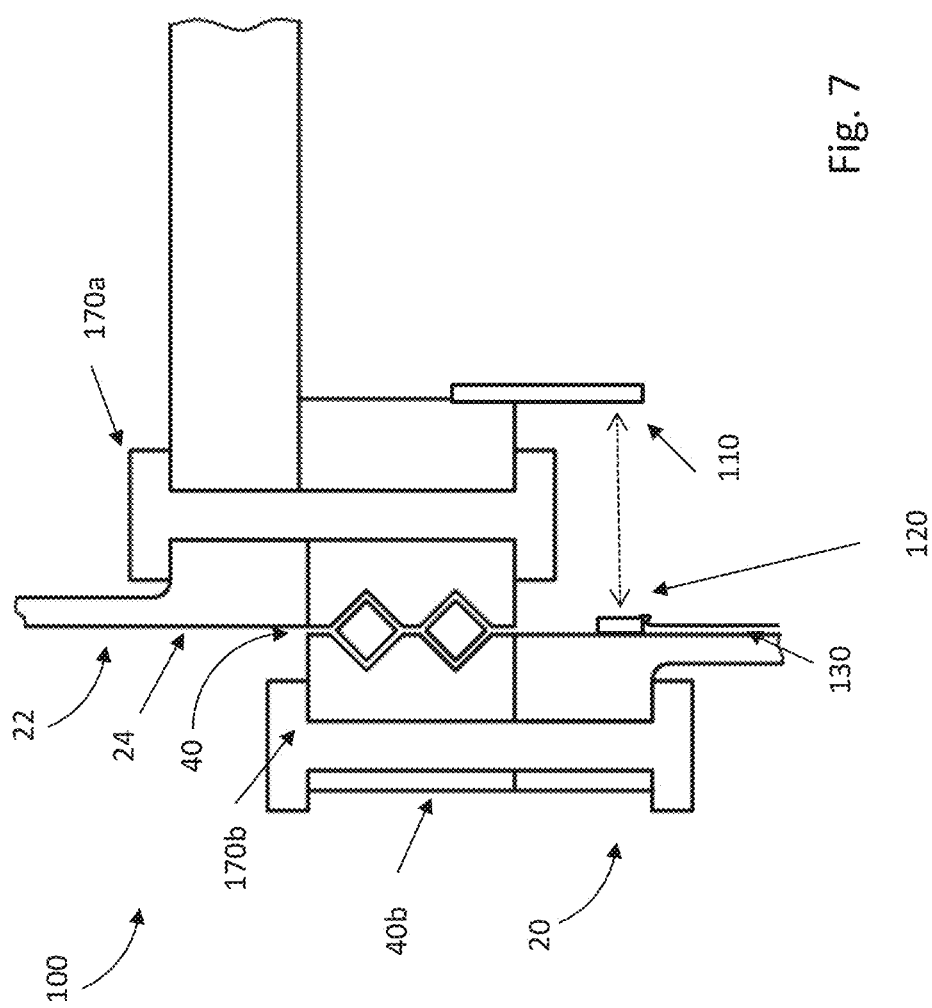
Figure 8:
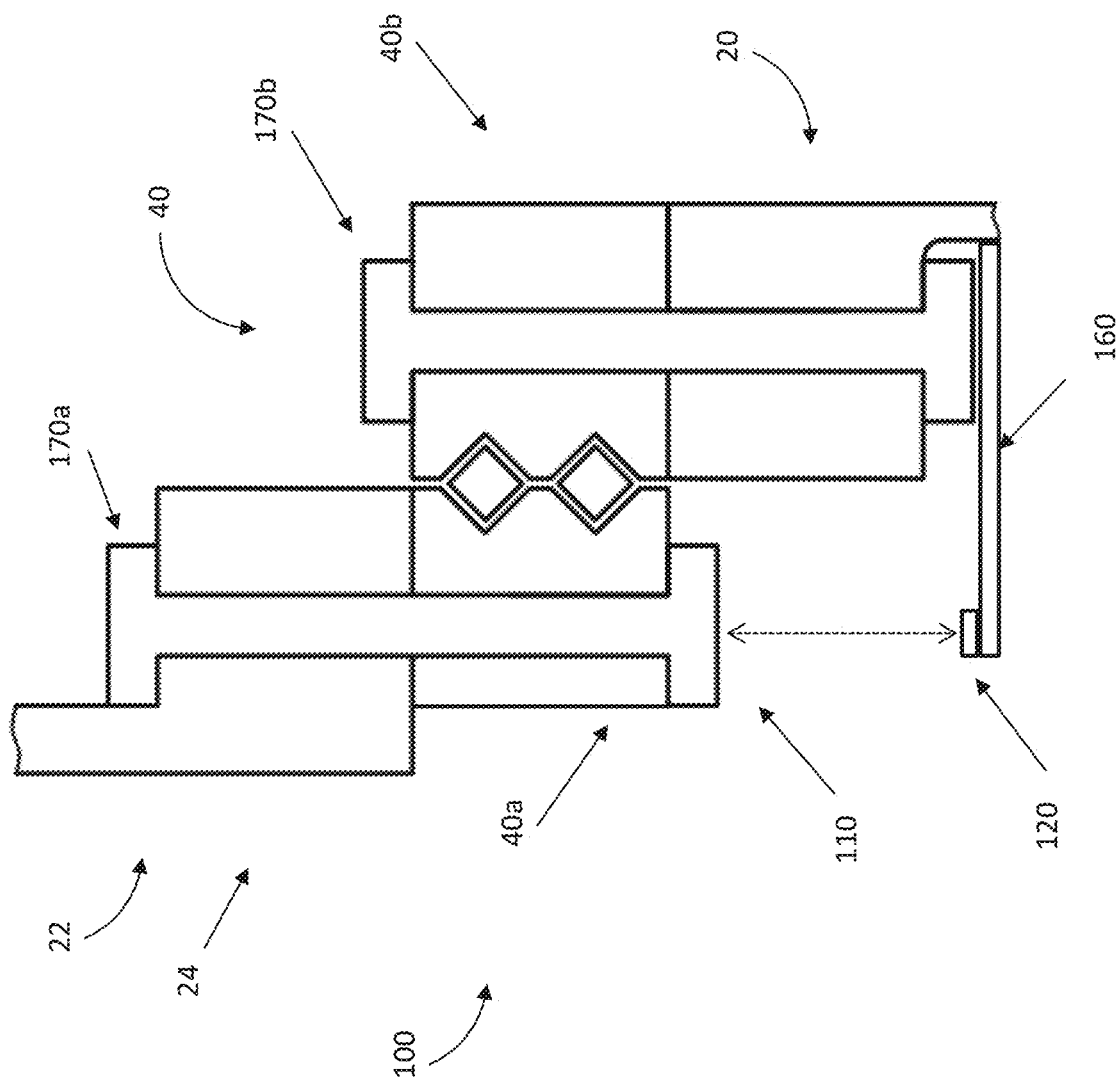

The displacement sensor 120 may be fixed to the hub 20 directly, as for instance shown in FIG. 7, or indirectly, e.g. using a flange or brackets 160 mounted on the hub 20, as for instance shown in FIGS. 4, 5, 6 and 8. The displacement sensor 120 may also be mounted on the non-rotating component 40*b* of the pitch bearing 40. The displacement sensor 120 may be mounted in the interior of the hub, as for instance shown in FIGS. 4 to 7. Such an installation of the displacement sensor 120 in the interior of the hub 20 offers the advantage that the displacement sensor 120 is less exposed to environmental influences. Especially offshore wind turbines can be subject to extreme environmental influences which can cause damage especially to those components attached to the outside of the wind turbine 10. However, the displacement sensor 120 may also be mounted externally to the hub, as for instance shown in FIG. 8. In particular, such installation may be advantageous for an arrangement where the rotor blade 22 is attached to the outer component of the pitch bearing 40.

Figure 9:
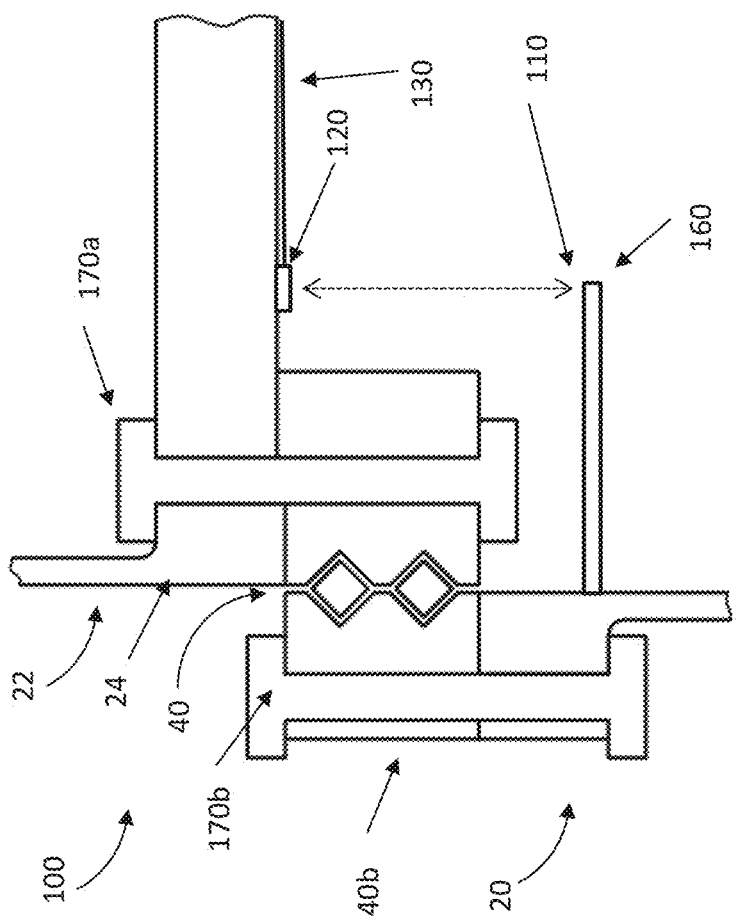

As an alternative to the arrangements in FIGS. 4 to 8, the reverse arrangement is possible. In a reverse arrangement the displacement sensor 120 is fixed to the rotor blade 22 while the reference plane 110 has a fixed position with respect to the hub 20. According to one aspect, the hub comprises the reference plane 110. For example, the reference plane 110 may be part of the hub 20 or may be a part of a component that is firmly fixed to the hub. The displacement sensor 120 may be fixed to the rotor blade 22, in particular to the blade root 24, or to a surface of a flange or bracket attached to the rotor blade 22. The displacement sensor 120 may also be fixed to the pitch bearing 40, in particular, to the rotating component 40*a* of the pitch bearing 40, or to bolts 170*a*. One exemplary reverse arrangement is shown in FIG. 9 showing the displacement sensor 120 fixed to the bottom surface of the blade root 24 while a flange 160 mounted on the hub 20 comprising the reference plane 110.

The displacement sensor 120 may be a sensor emitting field such as an electromagnetic field and detecting changes in the field. According to one aspect, the displacement sensor 120 is a proximity sensor. A proximity sensor is a sensor being able to detect the presence of a nearby object without physical contact. For example, the proximity sensor may be a capacitive, inductive, magnetic or optical sensor. An inductive sensor may be advantageous in case the reference plane is made from metal.

In some embodiments, the system 100 comprises only one displacement sensor 120. Already one displacement sensor 120 may provide a wide range of useful information allowing a meaningful estimation of wind loads and moments acting on the rotor blade 22. The omission of multiple sensors further contributes to cost savings for material as well as in construction and maintenance. For example, the displacement sensor 120 is mounted in such a way that the displacement sensor 120 detects the displacement of such a reference plane 110 which is exposed to relatively large displacements. Such position may be derived from those skilled in the art based on the main wind load direction. For example, the displacement sensor 120 may be mounted around the longitudinal axis of the rotor blade, similar to a number on a dial. If a virtual vector between 12 o'clock and 6 o'clock of such dial would reflect the main wind load direction (dominant direction), the displacement sensor 120 may be mounted either at 6 or at 12 o'clock.

In some embodiments, the system 100 comprises a plurality of displacement sensors 120. In this case, each displacement sensor 120 may have its own reference plane 110, such that the system also comprises a plurality of reference planes 110. For example, the reference planes 110 may be a surface of different bolts 170*a*, respectively. Alternatively, the plurality of displacement sensor 120 may use the same continuous surface as reference planes 110, e.g. the bottom surface of the rotating component 40*a* of the pitch bearing 40. Such surface may be considered as a plurality of reference planes 110 into which the continuous surface is virtually divided.

The plurality of displacement sensors increases the number of measurement data. In particular, this enables a more accurate estimation of wind loads acting on the rotor blade 22. More than one displacement sensors 120 may also provide a self-verifying system as described below. According to one aspect, the plurality of displacement sensors 120 is mounted around the longitudinal axis of the rotor blade, similar to the numbers on a dial.

For example, the system 100 may comprise two displacement sensors 120. In some embodiments, the two displacement sensors 120 may be mounted around the longitudinal axis of the rotor blade at a uniform distance from each other, i.e. at 6 and at 12 o'clock. The two displacement sensors 120 may be mounted such that a vector between them reflects the main wind load direction (dominant direction). Two opposing displacement sensors 120, such as those at 6 and 12 o'clock, may detect essentially the same displacement of the corresponding reference planes 110 (with reversed sign/direction). However, such arrangement allows the measured values to be mutually validated, so that the system checks itself and the data becomes more accurate.

The two displacement sensors 120 may also be mounted such that they monitor particularly the flapwise or the edgewise movement of the rotor blade 22 by detecting the displacement of a corresponding reference plane 110. In some embodiments, the two displacement sensors 120 may be mounted around the longitudinal axis of the rotor blade at an angle of 90 degree to each other, i.e. at 9 and at 12 o'clock. This way, the two displacement sensors 120 may simultaneously monitor the flapwise and the edgewise movement of the rotor blade. For example, one displacement sensor 120 may particularly monitor an edgewise movement of the rotor blade whereas the other one particularly monitors a flapwise movement of the rotor blade. In case the displacement sensors 120 are fixed to the hub, the displacement sensors may be arranged such that they monitor the flapwise or the edgewise movement of the rotor blade 22 when the rotor blade 22 is in its full power position. For example, one displacement sensor 120 may be mounted along a virtual vector reflecting the dominant direction and the other displacement sensor 120 may be mounted along a virtual vector reflecting the corresponding perpendicular direction. In case the displacement sensors 120 are mounted on the rotor blade 22, the displacement sensors rotate together with the rotor blade 22 and, thus, they can be easily arranged in a way that they always measure the flapwise and the edgewise moments. For the latter, a determination of edgewise and the flapwise loads may dispense with a coordinate transformation from a fixed into a rotating frame.

In some embodiments, the system 100 may comprise three displacement sensors 120. The three displacement sensors 120 may be mounted around the longitudinal axis of the rotor blade at a uniform distance from each other, i.e. at 2, 6 and at 10 o'clock. Alternatively, the three displacement sensors 120 may be mounted around the longitudinal axis of the rotor blade at an angle of 90 degree to each other, i.e. at 6, 9 and at 12 o'clock. For example, the displacement sensors 120 mounted at 6 and 12 o'clock are mounted in such a way that a vector between them reflects the dominant direction (direction of main wind load). The displacement sensor 120 mounted at 9 o'clock may be mounted on a virtual line reflecting a non-dominant direction. The displacement sensors 120 mounted at 6 and 12 o'clock may detect the displacement of such reference planes 110 which are exposed to relatively large displacements compared to the displacement of the reference plane 110 of the displacement sensor 120 mounted at 9 o'clock.

Figure 10:
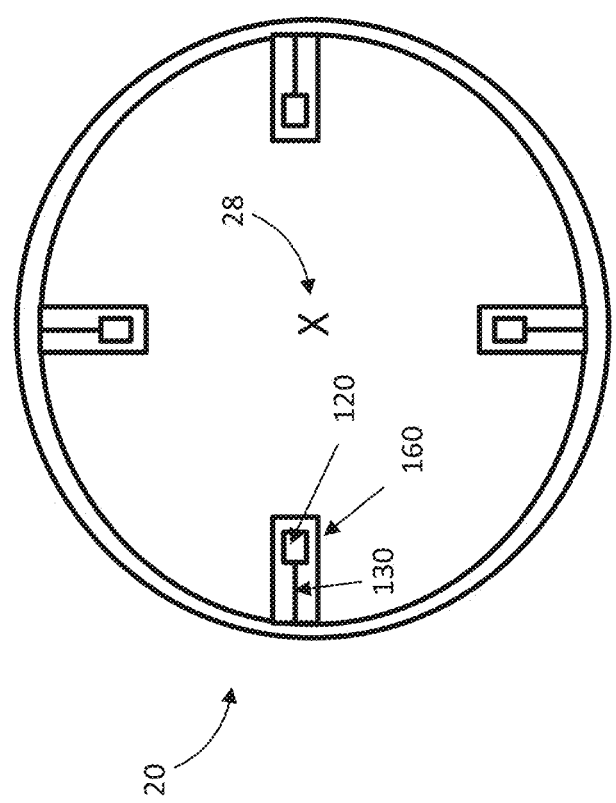
FIG. 10 illustrates n exemplary arrangement of four displacement sensors fixed to a hub according to the present disclosure.

In other embodiments, the system 100 may comprise four displacement sensors 120. For example, the four displacement sensors 120 may be mounted around the longitudinal axis of the rotor blade at 3, 6, 9 and 12 o'clock, as for instance illustrated in FIG. 10. Two of the four displacement sensors 120, e.g. those at 3 and 9 o'clock, may be configured to monitor particularly the flapwise movement of the rotor blade by detecting the displacement of corresponding reference planes 110. The other two displacement sensors 120, e.g. those at 6 and 12 o'clock may be configured to monitor particularly the edgewise movement of the rotor blade by detecting the displacement of a corresponding reference planes 110. With such configuration the measured data of each displacement sensor 120 is validated by one of the other displacement sensors 120, such that the accuracy of the data can be evaluated and the data can be interpreted and processed, accordingly.

In other embodiments, the system 100 may comprise more than four displacement sensors 120.

The displacement sensor(s) 120 may be communicatively coupled to the controller 26. Thus, the controller 26 may be provided with actual measured data that allow a determination or meaningful estimation of moments acting on the rotor blade 22. The controller 26 may process the data received from the displacement sensor(s) 120. For example, controller 26 may be configured to determine a bending moment exerted on a part of the rotor blade 22. In particular, the controller 26 may be configured to determine a bending moment exerted on the blade root 24 of the rotor blade 22 based on signals received from the displacement sensor(s) 120. Rotor blade bending moments allow an estimation of wind loads acting on rotor blades. The controller 26 provided with actual measured data may determine a bending moment instead of using estimated values provided by an algorithm. Hence, according to one aspect of the invention system 100 is a system for determining a bending moment of the blade root 24 of the rotor blade 22.

With the data measured by the displacement sensor(s) 120 controller 26 may also determine or estimate other influences and/or changes regarding the rotor blades 22. For example, ice accretion or fouling can influence the weight of the rotor blade 22 and, thus, may influence the displacement of the reference plane 110. Hence, controller 26 may be configured to determine ice accretion or fouling of the rotor blades based on signals received from the displacement sensor(s) 120.

In additional embodiments, the system 100 may further comprise a communication path 130. The communication path 130 may be configured to transfer the data received from the displacement sensor(s) 120 to the controller 26. The communication path 130 may comprise a cable. The communication path 130 may be configured to transfer the signals from the displacement sensor 120 to the controller 26 without transferring the signals from the rotor blade 22 to the hub 20. The latter is particularly relevant for the arrangement in which the displacement sensor 120 is fixed to the hub. The controller 26 is not located in rotor blade 22. Moreover, if each displacement sensor 120 is fixed to the hub 20, the displacement sensors 120 are also not located in rotor blade 22. Consequently, there is no need to transfer the data received from the displacement sensor(s) 120 from or to the rotor blade 22. This avoids the need for complicated and potentially vulnerable installations that allow data to be transferred between two components, wherein one is rotating relative to the other. For example, with such communication path 130 there is no need to pass cables from the hub 20 to the rotor blade 22 rotating relative to the hub 20. The latter is necessary, for example, when measuring the bending moment of the blade root with strain gauges or fiber Bragg gauges.

Strain gauges or fiber Bragg gauges measurement devices are very sensitive equipment, whereas system 100 using displacement sensor(s) 120 is a very stable and reliable system. In particular, system 100 with displacement sensor 120 fixed to the hub is not dependent on an additional connection between rotor blade and hub (next to the one via the bearing), which is favored for example by the non-contact measurement of the displacement sensor(s) 120 and by the communication path 130 as described above.

In further embodiments, the system 100 may comprise a pitch adjustment mechanism 32 as described above. With the pitch adjustment mechanism 32 the controller 26 may adjust the pitch angle of the rotor blade 22 in dependence of the determined bending moments exerted on a the blade root 24 of the rotor blade 22. The adjustment of the pitch angle allows system 100 to control loads and/or forces from wind acting on the rotor blade 22.

In another aspect, the present disclosure is directed to a nacelle assembly of a wind turbine 10 mounted atop a tower 12. The nacelle assembly comprises a nacelle 16, a hub 20 and a plurality of rotor blades 22. According to one aspect, the number of rotor blades is three. The rotor blades 22 may be coupled to the hub 20 with a plurality of pitch bearings 40. Further, the nacelle assembly comprises a plurality of reference planes 110 as those described with reference to system 100. Each reference plane 110 may be configured to move with one rotor blade 22 of the plurality of rotor blades as the rotor blade 22 moves relative to the hub 20. In particular, the rotor blade 22 may comprise the reference plane 110. The nacelle assembly may further comprise a plurality of displacement sensors 120 which are fixed to the hub 20. Each of the displacement sensors 120 may be configured to detect a displacement of one reference plane 110 of the plurality of reference planes relative to the hub 20 without physical contact. Alternatively, each reference plane 110 of the plurality of reference planes may have a fixed position with respect to the hub 20 while each displacement sensor 120 of the plurality of displacement sensors is fixed to a rotor blade 22 of the plurality of rotor blades. In this case, each of the displacement sensors 120 may be configured to detect without physical contact a displacement of one reference plane 110 of the plurality of reference planes relative to a blade root 24 of the respective rotor blade 22 to which the displacement sensor 120 is fixed. The plurality of displacement sensors 120 and reference planes 110 may form a plurality of sensor-plane pairs, wherein each pair sensor-plane pair is assigned to one rotor blade 22, respectively. In particular, each rotor blade 22 may be attributed to the same number of sensor-plane pairs. For example, each rotor blade 22 may be attributed with four sensor-plane pairs. The plurality of displacement sensors 120 may be communicatively coupled to a controller 26 as described with reference to system 100. Controller 26 may be configured to determine a bending moment exerted on a blade root 24 of the rotor blade 22 based on signals received from the displacement sensors 120.

Figure 11:
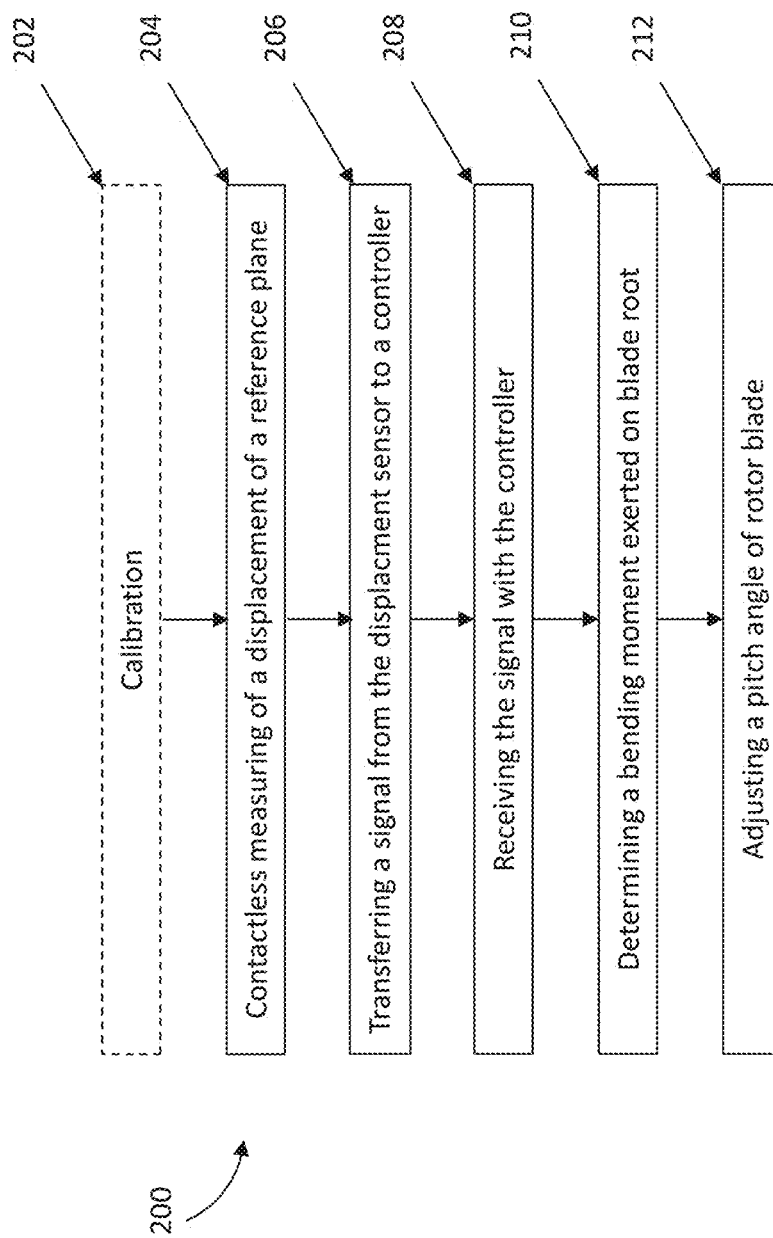
FIG. 11 illustrates a flow diagram of one embodiment of a method for measuring displacements of a blade root according to the present disclosure
Figure 12:
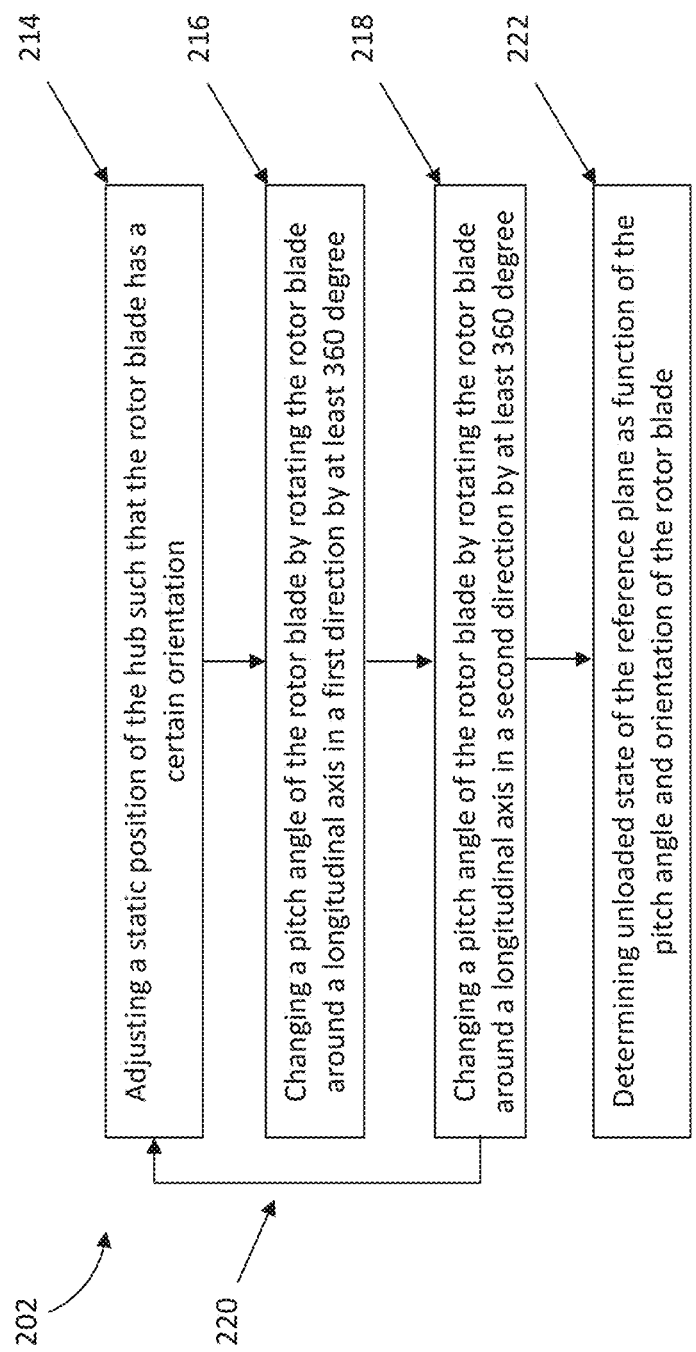
FIG. 12 illustrates a flow diagram of one embodiment of a calibration step of a method for measuring displacements of a blade root according to the present disclosure.

Referring now to FIG. 11, a flow diagram of one embodiment of a method 200 for measuring displacements of a blade root of a rotor blade of a wind turbine, such as the wind turbine 10 of FIG. 1, is illustrated. Method 200 may be performed with system 100. As shown at 204, method 200 comprises contactless measuring performed with at least one displacement sensor 120. The contactless measuring comprises measurement of a displacement 122 of a reference plane 110. The reference plane 110 may configured to move with the rotor blade 22 which is coupled to the hub 20 as the rotor blade 22 moves relative to the hub 20 while the displacement sensor 120 fixed to the hub 20. For example, the rotor blade 22 may comprise the reference plane 110. Alternatively, the reference plane 110 may have a fixed position with respect to the hub 20 while the displacement sensor 120 is fixed to the rotor blade 22.

The method may further comprise transfer of a signal from the displacement sensor(s) 120 to a controller 26 as illustrated at 206. Such transfer may be realized with a communication path 130 as described above. As shown at 208, the method may further comprise receiving the signal from the displacement sensor 120 with the controller 26.

In some embodiments, the method may further comprise a determination step 210 being determining a bending moment exerted on a blade root 24 of the rotor blade 22. This determination may be based on signals received from the displacement sensor(s) 120. Step 210 may be performed with controller 26. Controller 26 may further communicate with the pitch adjustment mechanism in order to adjust a pitch angle of the rotor blade (step 212) by rotating the rotor blade around a longitudinal axis 28 of the rotor blade 22. The adjustment of the pitch angle controls the wind load and power generated by wind turbine 10. According to one aspect, determination step 210 comprises determining a flapwise and an edgewise bending moment.

In some embodiments, the method may further comprise a calibration step 202. Calibration step 202 is further illustrated in FIG. 11. Calibration of method 200 may take place after installation of system 100. For calibration of method 200 one may perform several pitch rolls, i.e. changing the pitch angle of the rotor blade 22 by rotating the rotor blade 22 around a longitudinal axis by at least 360 degree, with hub 20 in several positions. The orientation of the rotor blade 22 may be different for each static position of the hub 20. According to one aspect, the static positions of hub 20 are chosen such that the rotor blade 22 experiences a different influence of gravity in each position. An unloaded displacement of the reference plane 110 is measured while the pitch rolls take place, wherein the unloaded displacement describes a displacement 122 without wind loads acting on rotor blade 22. Using the measured unloaded displacement as well as considering the static moment of rotor blade 22 may allow to determine an unloaded state as function of the pitch angle and the orientation of the rotor blade 22 (step 222). As shown at 214, a static position of hub 20 may be adjusted. The pitch rolls at this position of hub 20 may be performed in a first direction (step 216). Optionally, another pitch roll at the same position of hub 20 is performed in a second direction, wherein the second direction is opposite to the first direction (step 218). Steps 214, 216 and optionally step 218 may be repeated at least three times (step 220). In dependence of the orientation of rotor blade 22, the different positions of hub 20 may lead to different forces and moments acting on the rotor blade 22. According to one aspect, the calibration step comprises four static positions of hub 20 wherein rotor blade 22 points once upwards, once to the right, once downwards and once to the left. For example, at a first static position rotor blade 22 may point downwards, i.e. rotor blade 22 is particularly perpendicular to the ground. In this position, no bending moment is exerted on the blade root 24 and only the blade mass determines the unloaded displacement. At a second static position rotor blade 22 may point upwards, wherein also no bending moment is exerted on the blade root 24 and only blade mass determines the unloaded displacement. In the first and second static position, the weight force of the blade mass acts in opposite directions relative to the displacement sensor(s) 120 in the hub. Measurements at the first and second static position allow determination of an unloaded "zero point". In a third and fourth static position blade root 22 may point to the left and to the right, respectively, i.e. rotor blade is particularly parallel to the ground. In the third and fourth position bending moment is exerted on the blade root 24 due to the blade mass. Measurements at the third and fourth static position act as calibration load. It is to be understood that the terms first, second, etc. do not reflect the sequence of the steps. For example, the measurement at the third position may take place previous to the measurement at the first position.

There is also the possibility to do the "zero point"-mapping before the rotor blades are mounted to the hub. As part of the end-of-production-line-functionality-test the rotating component 40a of each pitch bearing 40 may be rotated by at least 360 degree while the unloaded displacement of rotating component 40a is measured. With this calibration step eliminate 3 of the 4 described calibration positions above may be eliminated as one would only need one calibration load, i.e. one static position with rotor blade 22 pointing to the left or right.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A system of a wind turbine, the system comprising:
a hub, the hub comprising a non-rotating component of a pitch bearing;
a rotor blade comprising a blade root, the blade root comprising a blade root end and a rotating ring component of the pitch bearing affixed to the blade root end;
a plurality of non-contact displacement sensors operably facing the rotor blade and fixed directly or indirectly to the hub;
a respective reference plane associated with each of the plurality of non-contact displacement sensors, the respective reference planes defined by the rotor blade or a component that moves with the rotor blade as the rotor blade moves relative to the hub;
wherein each of the plurality of non-contact displacement sensors detects relative movement between the respective reference plane and the hub without being physically connected to the component defining the respective reference plane; and
wherein the plurality of displacement sensors are mounted opposite to and facing their respective reference plane.

2. The system of claim 1, further comprising a controller communicatively coupled to the plurality of displacement sensors, the controller configured to determine loads exerted on the rotor blade based on displacement of the blade root indicated by signals received from the plurality of displacement sensors.

3. The system of claim 2, further comprising a pitch adjustment mechanism communicatively coupled with the controller, the pitch adjustment mechanism comprising a pinion gear engaged with the rotating ring component of the pitch bearing to adjust a pitch angle of the rotor blade by rotating the rotor blade around a longitudinal axis of the rotor blade, wherein the controller is configured to adjust the pitch angle of the rotor blade in dependence of the determined loads.

4. The system of claim 2, further comprising a communication path configured to transfer the signals received from the plurality of displacement sensors to the controller without transferring the signals from the rotor blade to the hub.

5. The system of claim 1, wherein the plurality of displacement sensors are configured to detect displacement of their respective reference plane in one or more different directions.

6. The system of claim 1, wherein the plurality of displacement sensors are located within an interior of the hub.

7. The system of claim 1, wherein the plurality of displacement sensors are arranged around a longitudinal axis of the rotor blade at a uniform distance from each other.

8. The system of claim 1, wherein each of the respective reference planes is defined by one of: a surface of the blade root end, or a surface of the rotating ring component, or a component separate from the associated displacement sensor attached to the blade root end, or a component separate from the associated displacement sensor attached to the rotating ring component.

9. The system of claim 1, wherein each of the plurality of displacement sensors is fixed directly to the hub, or is fixed on a component attached to the hub.

* * * * *